United States Patent
Farsakh (10) Patent No.: US 6,317,612 B1
(45) Date of Patent: Nov. 13, 2001

(54) METHOD FOR ESTIMATING SPATIAL PARAMETERS OF TRANSMISSION CHANNELS BY ESTIMATING A SPATIAL COVARIANCE MATRIX

(75) Inventor: Christof Farsakh, Munich (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/140,875

(22) Filed: Aug. 27, 1998

(30) Foreign Application Priority Data

Aug. 27, 1997 (DE) ............................................. 197 37 365

(51) Int. Cl.[7] ...................................................... H04B 1/38
(52) U.S. Cl. ............................ 455/562; 455/452; 370/329
(58) Field of Search .................................... 455/67.1, 509, 455/423, 450, 451, 452, 561, 562; 370/335, 342, 441, 329

(56) References Cited

U.S. PATENT DOCUMENTS

| | | | |
|---|---|---|---|
| 5,260,968 | * | 11/1993 | Gardner ..................................... 375/1 |
| 5,592,490 | * | 1/1997 | Baratt ..................................... 370/310 |
| 5,771,439 | * | 6/1998 | Kennedy ................................. 455/63 |
| 5,886,988 | * | 3/1999 | Yun ....................................... 370/329 |

FOREIGN PATENT DOCUMENTS

| | | |
|---|---|---|
| 195 11 752 A1 | 3/1995 | (DE). |
| 197 13 666 | 3/1995 | (DE). |

* cited by examiner

Primary Examiner—Daniel Hunter
Assistant Examiner—Nick Corsaro
(74) Attorney, Agent, or Firm—Schiff Hardin & Waite (57) ABSTRACT

A method for estimating spatial parameters of a transmission channel between radio stations in communication systems is provided where it is assumed that an antenna means consisting of several individual radiators is allocated to a radio station. With the aid of these individual radiators, sampled values of a receive signal are determined, from which a receive matrix is formed. An estimated value for the spatial covariance matrix of the transmission channel is determined by means of matrix multiplication of the receive matrix with the conjugated complex transposed receive matrix. If several connections are active simultaneously, connection-individual channel impulse responses based on training sequences or estimated values for the transmitted data, are determined from the sampled values, which channel impulse responses are used to determine the connection-individual spatial covariance matrices.

11 Claims, 5 Drawing Sheets

METHOD FOR ESTIMATING SPATIAL PARAMETERS OF TRANSMISSION CHANNELS BY ESTIMATING A SPATIAL COVARIANCE MATRIX

FIELD OF THE INVENTION

The present invention relates to a method and a means for the estimation of spatial parameters of transmission channels for connections between radio stations in communication systems. More specifically, the present invention relates to a method for the estimation of spatial parameters of transmission channels between mobile radio telephone networked with spatial subscriber separation, in particular in mobile radiotelephone networks with spatial subscriber separation.

BACKGROUND OF THE INVENTION

In communication systems, for example, mobile radiotelephone networks or wireless subscriber line systems, methods for spatial subscriber separation are known, e.g. from DE 197 13 666. In such SDMA (space division multiple access) systems, several communication connections can be supported in a common channel, whereby the channel in FDMA/TDMA systems (frequency-/time-division multiple access) is described by a frequency band and a time slot. For this purpose, adaptive antennas are used at the transmission side, e.g. in base stations of mobile radiotelephone networks. By means of these adaptive antennas, radiation or beam shaping can be used to form several radiation lobes coordinated with the respective position of the receiving radio station, e.g. mobile stations of mobile radiotelephone networks. The spatial resolution used for the separation of subscriber signals takes place by means of these radiation lobes, which are independent of one another.

The transmission path from a base station to a mobile station is called the downward path, and the transmission path from a mobile station to a base station is called the upward path. The spatial subscriber separation by means of radiation shaping is used to particular advantage in the downward path, since for reasons of cost it is preferable to provide only the base station with an antenna means consisting of several individual sensors.

A spatial subscriber separation results in increased capacity in mobile communication systems, since, in addition to other subscriber separation methods TDMA, FDMA or CDMA, a larger number of communication connections can be supported, for the same required bandwidth.

In addition, in communication systems with SDMA subscriber separation the problem occurs with the selection of a suitable channel for an additional connection due to a connection setup or due to a handover procedure from an adjacent cell. For this purpose, it must be assessed whether and to what extent several subscribers operating in the same channel can be spatially separated by means of radiation shaping, i.e. whether for example their dominant directions of incidence are not located too close to one another.

Both for the assessment of the spatial separability of several subscriber connections and also for the calculation and updating of the radiation shaping coefficients after the channel allocation, estimated values concerning spatial parameters of the transmission channels between the subscribers and the base station are required. One possibility for modeling spatial transmission channels is to postulate the existence of a finite number of discrete propagation paths between the mobile and the base stations. The corresponding spatial parameters are given alongside the number of paths by means of the directions of incidence and complex-valued transmission factors of each path. A method for the estimation of these parameters is known from DE 195 11 752; further algorithms of this type can be found in the relevant literature under the trade names MUSIC, ESPRIT and Unitary ESPRIT.

However, the aforementioned methods lead to a high computing expense and high sensitivity to antenna flaws, and fail completely in spatially diffuse scenarios that can no longer be described by a finite number of discrete propagation paths, but rather only by a continuous spectrum of incidence.

SUMMARY OF THE INVENTION

Therefore, an underlying object of the invention is to provide a method for the accurate and reliable estimation of spatial parameters of transmission channels that can be carried out with a low computing-related expense.

In addition, another object of the present invention is to provide an accurate and reliable means for carrying out the method is indicated.

In the inventive method for the estimation of spatial parameters in communication systems, it is assumed that the subscriber-specific spatial covariance matrices represent the decisive spatial parameters both for the radiation shaping and for the assessment of the spatial separability. If the subscriber-specific directions of incidence and path attenuations are known, these matrices can be calculated; however, the goal of the inventive method is the direct calculation of these matrices from the sampled values measured at the base station in the upward direction, without having to make a detour via the estimation of the direction, which is expensive and subject to model error.

The determination of the spatial covariance matrices for the downward path from the receive data in the upward path is based on the knowledge that in most current mobile radiotelephone systems, given corresponding chronological averaging or mean value formation, these matrices differ only inessentially from one another in the upward and in the downward path. No model assumptions concerning the type of incidence spectra at the base station (e.g. discrete/continuous, many/few directions of incidence) are required.

This type of determination of the relevant spatial parameters forms the foundation for a reliable channel allocation and radiation shaping of a connection that is not susceptible to small estimation errors. Estimation errors that may occur lead only to a continuous degradation in performance (graceful degradation) and not to an abrupt collapse of the radiation shaping. In a mobile radiotelephone environment, this is particularly important for the practical realization.

According to the method, spatial parameters are obtained directly, without an expensive estimation of direction. If a spatial reciprocity in both directions of transmission can be assumed in such communication systems, then, with the aid of the spatial parameters, control signals are produced for the opposite direction of transmission. This is likewise possible if there is a frequency offset between the two directions of transmission, and if the group responses in the two frequency bands differ only slightly. Given greater deviations, a modification of the spatial parameters is required.

For the execution of the inventive method, a reception matrix is preferably formed from an arbitrarily determinable number of scanned values, which are measured at the individual sensors of the base station and which originate from signals radiated by one or more mobile apparatuses.

In a specific embodiment of the method that is particularly advantageous if only a single subscriber is transmitting, the spatial covariance matrix to be estimated is easily determined by multiplication of the receive matrix with its complex conjugate transpose.

If the transmission power in the upward path of this subscriber (or, respectively, an estimated value thereof) is known, it is useful to norm the spatial covariance matrix obtained in this way by means of division by this transmission power.

The estimation of the covariance matrix can advantageously be optimized by means of adaptation of the number of sampled values to the time variance of the channel. When the number increases, the reaction to rapid channel modifications improves, and when it decreases the averaging characteristics improve via the rapid fading, so that brief disturbances of the transmission channel are better compensated.

It is particularly advantageous to form the receive matrices segment by segment for several times, and to superpose the estimated values of several times to form a common covariance matrix. In this way, each determination of the spatial parameters is stabilized by means of already-existing experimental values from the previous determination, and is thus made more reliable.

In this case, it can also be advantageous if the number of estimated values to be averaged and their weighting can be adjusted corresponding to the channel transmission coefficients.

In a further construction of the invention, in the superposition of the estimated values of several times the respectively older estimated values can be multiplied by a forgetting factor, so that the current estimation is evaluated more highly than are past estimations.

By adapting the forgetting factor to the time variance of the channel, the estimation of the covariance matrix can be optimized in an advantageous manner. When the forgetting factor is increased, the reaction to rapid channel modifications also improves, and when it is decreased, the averaging characteristics of the method improve.

In a specific embodiment of the method, which is particularly advantageous when several subscribers are communicating with the base station in the same channel, the spatial covariance matrix to be estimated of a particular subscriber is easily determined by multiplication of the channel impulse response matrix associated with this subscriber by its complex conjugate transpose.

If the transmission power in the upward path of this subscriber (or, respectively, an estimated value thereof) is known, it can also be useful here to norm the spatial covariance matrix obtained in this way by means of division by this transmission power.

According to an advantageous feature of the invention, in the upward path the subscribers transmit symbols known a priori (e.g. training sequences or in pilot channels or pilot packets), which, however, must be different for the subscribers involved. By this means, the channel impulse response matrices of all subscribers transmitting in the same channel can be estimated simultaneously.

Alternatively, it is possible to use all symbols transmitted by the subscribers for the determination of the channel impulse response matrices, and not exclusively the symbols known a priori. Of course, this is possible only after a data detection that operates on the received signals, and that supplies estimated values for the transmitted data.

The first variant is less computing-intensive, and can be executed parallel to the data detection if necessary, so that the overall delay time of the system decreases. On the other hand, the second variant offers the advantage that as long as a somewhat reliable data detection is present in the upward path, which is a necessary precondition for the stability of the communication system anyway, considerably more existing knowledge can be brought into the estimation of the subscriber-individual channel impulse response matrices or, respectively, spatial covariance matrices. By this means, better estimation results are necessarily achieved than in the first variant.

For several subscribers, the stabilization, averaging and updating of the estimated subscriber-individual spatial covariance matrices can be carried out in a manner analogous to that described for the case of a single subscriber.

The spatial covariance matrix C and the channel impulse response matrix H are advantageously represented in the form of matrices of dimension M×M (M equals the number of individual radiators) or, respectively, of dimension M×V (V equals length of the channel impulse response). The channel impulse response matrix H contains the channel impulse responses of the channels between M individual radiators and the position of the mobile station. In this way, each channel can be described independent of discrete directions of incidence, and spatially diffused incidence scenarios can also easily be represented. The model of the existence of a finite number of direction-oriented channel impulse responses is thus expanded, so that a useful parameter estimation is possible even given a large number of partial waves and directions of incidence. The determination of the spatial parameters also works reliably given occlusions without a strong direct direction of incidence, since the determination is based directly on the received signals and makes do without an estimation of direction.

By means of the inventive method, a reliable parameter determination can be carried out even given antenna installations with few individual radiators. On the other hand, the simplicity of the computing steps required for the execution of the inventive method leads only to slight delay times, even given the use of a high number of individual radiators, whereby the radiation shaping in the opposite direction of transmission is simplified considerably.

In an embodiment, the present invention provides a method for estimating a spatial covariance matrix of a transmission channel between a central station and at least one subscriber station in a communication system wherein the central station includes an antenna having several individual sensors. The method of the present invention comprises the steps of chronologically sampling values of the individual sensors with the antenna over successive sampling times, for each sampling time, assigning the chronologically sampled values of the individual sensors to one of a plurality of reception vectors, conjugating the sample values of each reception vector and transposing the conjugated values of each reception vector to a corresponding complex transposed reception vector to provide a plurality of corresponding complex transposed reception vectors, and, averaging the sample values of a predetermined number of reception vectors and corresponding complex transposed reception vectors to determine the estimated value of a spatial coveriance matrix.

In an embodiment, the method further comprises the steps of arranging the reception vectors next to one another to yield a reception matrix, and, the averaging step further comprises multiplying the reception matrix and the complex transposed reception vectors and dividing the product thereof by the number of reception vectors.

In an embodiment, the averaging step further comprises initializing the spatial covariance matrix as a null matrix, multiplying each reception vector by its corresponding complex transposed reception vector to provide an inner product for each reception vector and corresponding complex transposed reception vector, adding each inner product to the spatial covariance matrix, and dividing the spatial covariance matrix by the number of reception vectors.

In an embodiment, the present invention provides a method for estimating subscriber station-specific spatial covariance matrices of transmission channels between a central station and a predetermined number of subscriber stations of a communication system. The central station includes an antenna consisting of several individual sensors. The method comprises the steps of chronologically sampling values of individual sensors at the central station and compiling the sample values as a predetermined number of reception vectors, determining a channel impulse response for each subscriber station for a transmission path between each subscriber station and each individual sensor of the antenna, correlating at least two channel impulse responses which correspond to the transmission paths between each subscriber station and two of the individual sensors of the antenna means and assigning the two channel impulse responses to a column number and a row number of a spatial covariance matrix for the subscriber station.

In an embodiment, the determining step further comprises the substeps of recording the channel impulse responses for each subscriber station as time-discreet sampled sets, arranging the time-discreet sampled sets as row vectors one over the other to provide a channel impulse response matrix for each subscriber station, generating a complex conjugated transpose response matrix for each subscriber station, and, the method further comprises the step of estimating the value of the spatial covariance matrix for each subscriber station by multiplying the channel impulse response matrix for each subscriber station by the conjugated complex transpose response matrix for each subscriber station.

In an embodiment, the method further comprises the step of dividing the estimated value of the spatial covariance for each subscriber station by a transmission power of said subscriber station.

In an embodiment, the method further comprises the steps of transmitting predetermined symbols for each subscriber station to the central station, the transmitted symbols being specific to each subscriber station, assigning the transmitted symbols to the channel impulse responses for each subscriber station.

In an embodiment, the method further comprises the steps of transmitting predetermined symbols for each subscriber station to the central station, the transmitted symbols being specific to each subscriber station, correlating the transmitted symbols from each subscriber station to the reception vectors for each subscriber station, and, assigning the transmitted symbols to the channel impulse responses for each subscriber station.

In an embodiment, the method further comprises the step of adjusting the number of receive vectors used based upon the channel transmission coefficients.

In an embodiment, the chronological sampling step is carried out over a predetermined number of sampling times for each subscriber station, and the correlating step is carried out for each sampling time for each subscriber station thereby generating a predetermined number of spatial covariance matrices for each subscriber station, and, the correlating step further comprises averaging the covariance matrices generated for each subscriber station to provide an improved estimated value of the spatial covariance matrix specific to each subscriber station.

In an embodiment, the predetermined number of sampling times corresponds to the channel transmission coefficients.

In an embodiment, the averaging step further comprises multiplying the spatial covariance matrices for sampling periods that have taken place at an earlier time by a factor of less than one, or by a limiting factor, and multiplying the spatial covariance matrices that have taken place at a later time by a factor of greater than one, or by an increase weighting factor.

In an embodiment, the averaging step further comprises exponential forgetting.

In an embodiment, a forgetting factor is used in the exponential forgetting that corresponds to the channel transmission coefficients.

In an embodiment, the present invention provides a system for estimating spatial parameters of a transmission channel between a central station and at least one subscriber station in a communication system. The system for estimating spatial parameters comprises an antenna comprising a plurality of individual sensors comprising a memory in which chronologically associated complex antenna sampled values of the individual sensors are stored as components of a reception vector. The antenna further comprises a signal processor which forms, for the antenna sample values of a common sampling time, conjugated complex values as components of a conjugated complex transposed receive vector. The signal processor further calculates an estimated value for the spatial covariance matrix of the transmission channel by averaging inner products of a predetermined number of reception vectors with the respective corresponding complex conjugate transpose reception vectors.

Other objects and advantages of the invention will become apparent upon reading the following detailed description and appended claims, and upon reference to the accompanying drawings.

BRIEF DESCRIPTION OF THE FIGURES

The invention is explained in greater detail in connection with various alternative embodiments, as shown in the figures, wherein.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
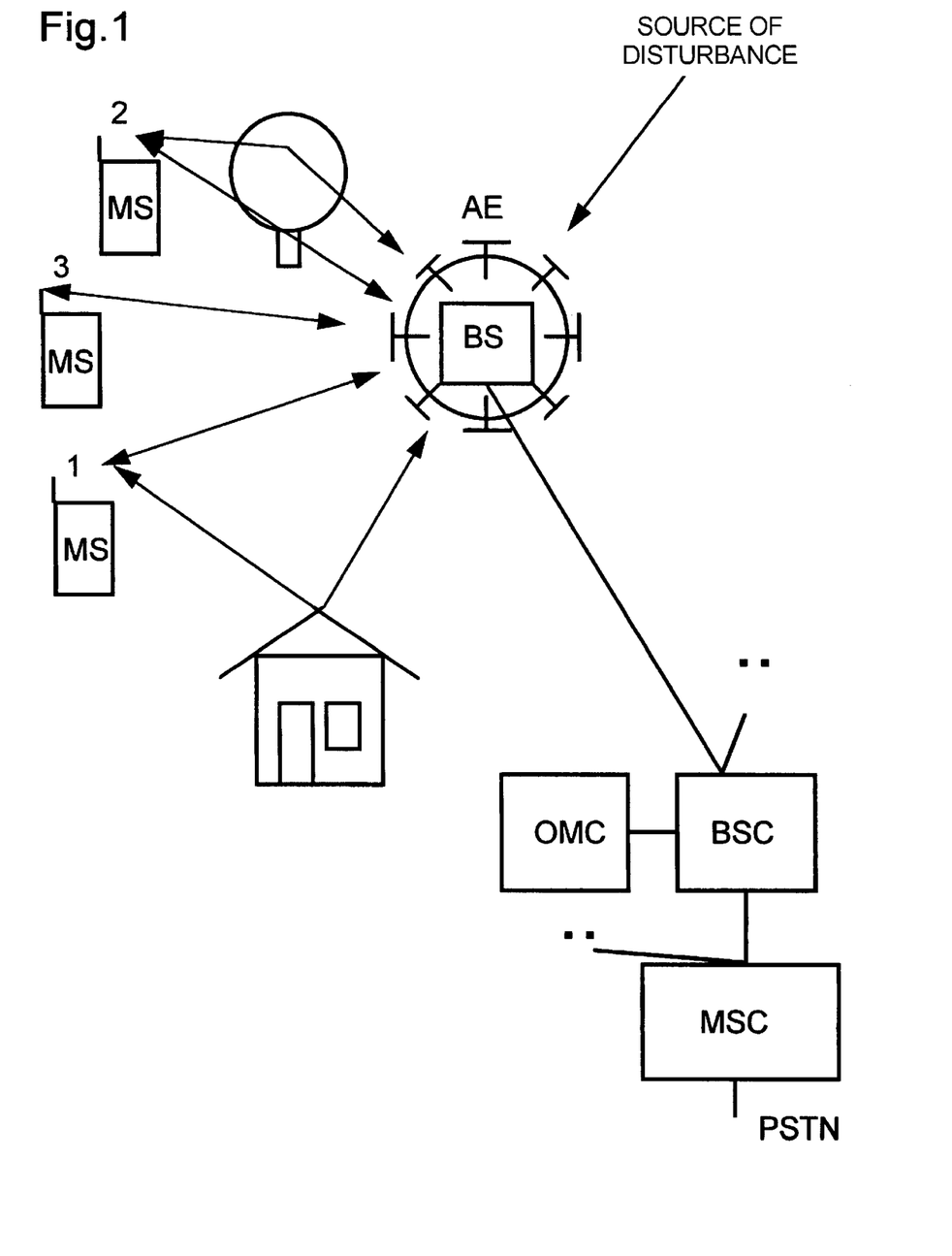
FIG. 1 is a schematic representation of a mobile communication system.

The mobile communication system shown in FIG. 1 corresponds in its structure to a known GSM mobile radiotelephone network consisting of a plurality of mobile switching centers MSC that are networked among one another or, respectively, provide access to a fixed network PSTN. In addition, these mobile switching centers MSC are connected respectively with at least one base station controller BSC. Each base station controller BSC enables in turn a connection to at least one base station BS—the central station. Such a base station BS is a radio station that can set up a connection to mobile stations MS (the subscriber station) via a radio interface.

In FIG. 1, by way of example three radio connections between three mobile stations MS and a base station BS are shown. An operations and maintenance center OMC realizes the supervision and maintenance functions for the mobile radiotelephone network or, respectively for parts thereof. The functionality of this structure can be transferred to other mobile radiotelephone networks or installations for wireless subscriber lines (i.e. the opposite terminals of the base station are stationary), in which the invention can be used.

The connections between the base station BS and the mobile stations MS are subject to a multi-path propagation, which can be caused by reflections, e.g. on buildings or planted areas, in addition to the direct propagation path. If a movement of the mobile stations MS is assumed, then the multi-path propagation, together with influences from sources of disturbance, brings it about that at the receiving base station BS the signal components of the various propagation paths of a subscriber signal are superposed in time-dependent fashion. In addition, it is assumed that the subscriber signals of different mobile stations MS superpose at the receive location to form a receive signal.

The base station BS shown in FIG. 1 has an antenna means AE with eight individual radiators, which form an adaptive antenna. By means of a radiation shaping in the base station BS, a spatial subscriber separation is carried out. The radiation shaping is carried out for the downward direction.

Figure 2:
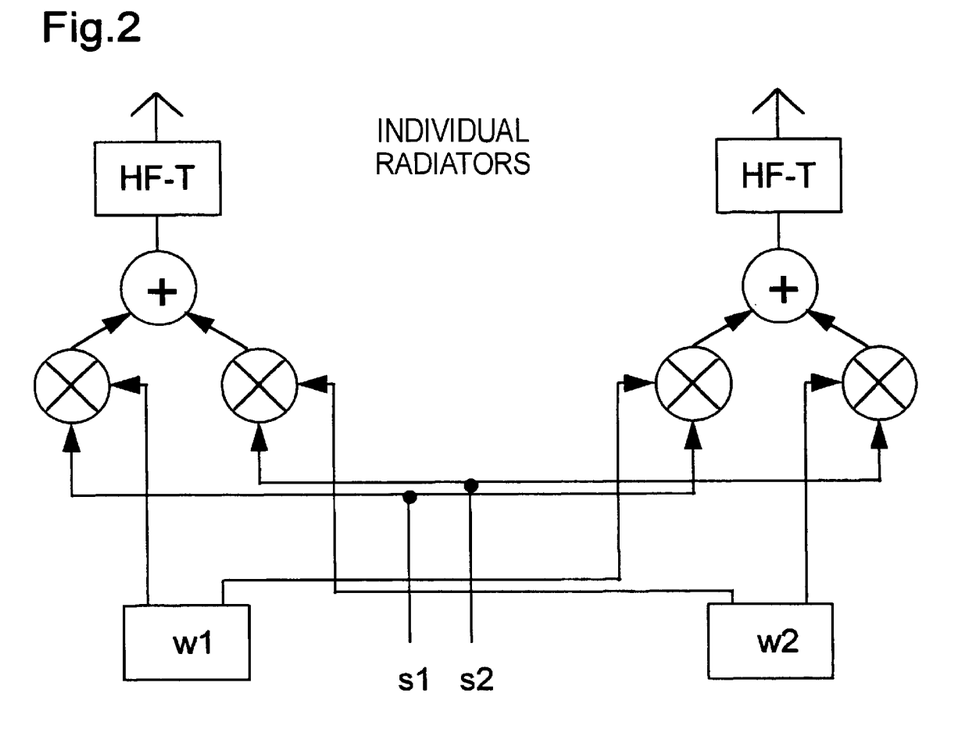
FIG. 2 is a schematic representation of a radiation shaping network.

For the upward direction, other evaluation methods are used. A network for radiation shaping is shown in FIG. 2, by way of example, for two connections with transmission signals s1 and s2. Weighting factors w1 and w2 are allocated to the connections, which vectors are multiplied by the transmission signals s1 and 2, whereby for each individual radiator the weighted transmission signals s1 and s2 are superposed, are converted into radio-frequency transmission signals in an RF part HF-T, and are subsequently radiated via M individual radiators. The transmission signals s1 and s2 are transmitted in the same frequency channel (same transmission frequency, and, if warranted, same time slot and/or code), and are separated only spatially.

By means of the use of different weighting vectors w1, w2 for the different connections, a radiation characteristic of the antenna means AE is produced that ensures an undisturbed reception of the transmission signals s1, s2 at the corresponding positions of the mobile stations MS. A precondition for the setting of the weighting vectors w1, w2 is a determination of spatial parameters in relation to the transmission channels of the individual connections.

A spatial separation of connections by means of radiation shaping fails if the transmission channels of the individual connections are not sufficiently separable spatially, i.e. if the main directions of incidence at the base station BS of the signals produced by them lie too close to one another. For the quantitative assessment of the "spatial separability," items of information concerning the spatial channel conditions of the signals and associated path attenuations are required. The same holds for the determination of advantageous weighting vectors $W_1, \ldots W_k$, by means of which the spatial separation of the individual connections in the downward path can be ensured. The spatial parameters can be represented in the form of spatial covariance matrices C.

A very general way of describing the upward path of a transmission channel in the upward path is provided by the spatial incidence power density $A_k(\psi,\theta)$, averaged over the fast fading, whereby the azimuth angle is designated $\psi$ and the angle of elevation is designated $\theta$. An overall transmission attenuation $\rho_k$, the logarithmic quotient of the transmission power at the mobile station MS of the subscriber k and the receive power resulting therefrom at each individual radiator of the base station BS, can be determined by means of the following relation from the direction of incidence density $A_k(\psi,\theta)$:

$$10^{\rho_k/10dB} = \int_{-\pi}^{+\pi} \int_{-\pi/2}^{+\pi/2} A_k(\psi, \theta) d\theta d\psi$$

Given narrow-band downward beam shaping (see FIG. 2), only the spatial covariance matrices $C_1 \ldots, C_k$, averaged over the rapid fading phenomena, are relevant, both for the assessment of the spatial separability in the downward path and also for the calculation of the weighting vectors $w_1, \ldots, w_k$. The spatial covariance matrix $C_k$ serves for the spatial description of the downward path associated with the subscriber k, thus of the transmission channel from the base station BS to the mobile station MS. Sufficient spatial reciprocity of the transmission direction is hereby assumed. The frequencies of the downward and upward paths are at least approximately identical, or lead to similar conditions of propagation, so that group responses in the downward path are approximately identical to those in the upward path.

The spatial covariance matrix $C_k$ is described by the following equation:

$$C_k = \int_{-\pi}^{+\pi} \int_{-\pi/2}^{+\pi/2} A_k(\psi, \theta) a(\psi, \theta) a^H(\psi, \theta) d\theta d\psi$$

$a(\phi,\theta)$ thereby designates the group response of the antenna means AE upon reception of a wave front.

The solutions belonging to the prior art represented the spatial covariance matrix $C_k$ as a sum, based on directions of estimation, of a discrete set of parameters, and not as an integral. The determination, described later, of the spatial covariance matrix C for the downward direction is based on reception values of the upward direction, and is carried out without an estimation of direction and without a determination of spatial incidence densities.

Figure 3:
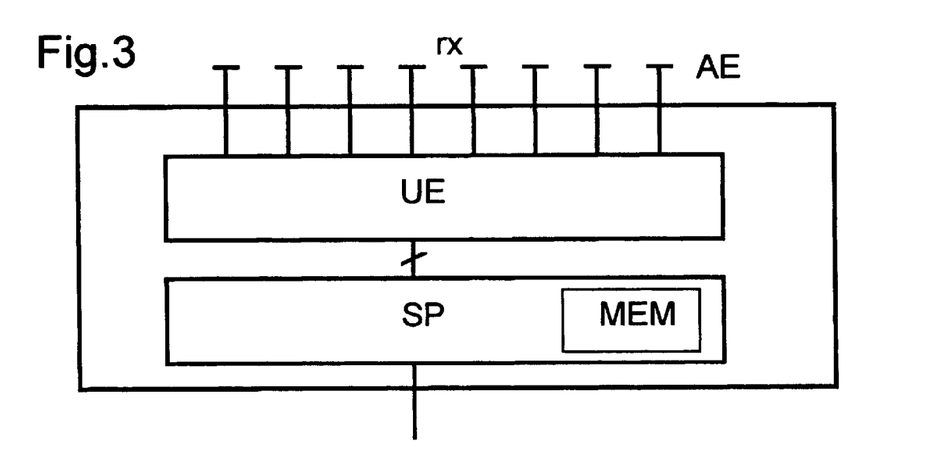
FIG. 3 is a schematic representation of a radio station.

FIG. 3 shows a means that carries out this determination of the spatial parameters. For this purpose, measurement values of the individual radiators of the antenna means AE are evaluated with respect to receive signals rx in a direction of transmission UE. After amplification, baseband transmission and analog/digital conversion, digitized input values of the receive signal are available to a digital signal processing means SP. These input values, and additional connection-individual parameters (training sequences as a priori items of information), as well as programs for executing the subsequent algorithms, are stored in storage means MEM. The means for the determination of spatial parameters is arranged in a base station BS.

Figure 4:
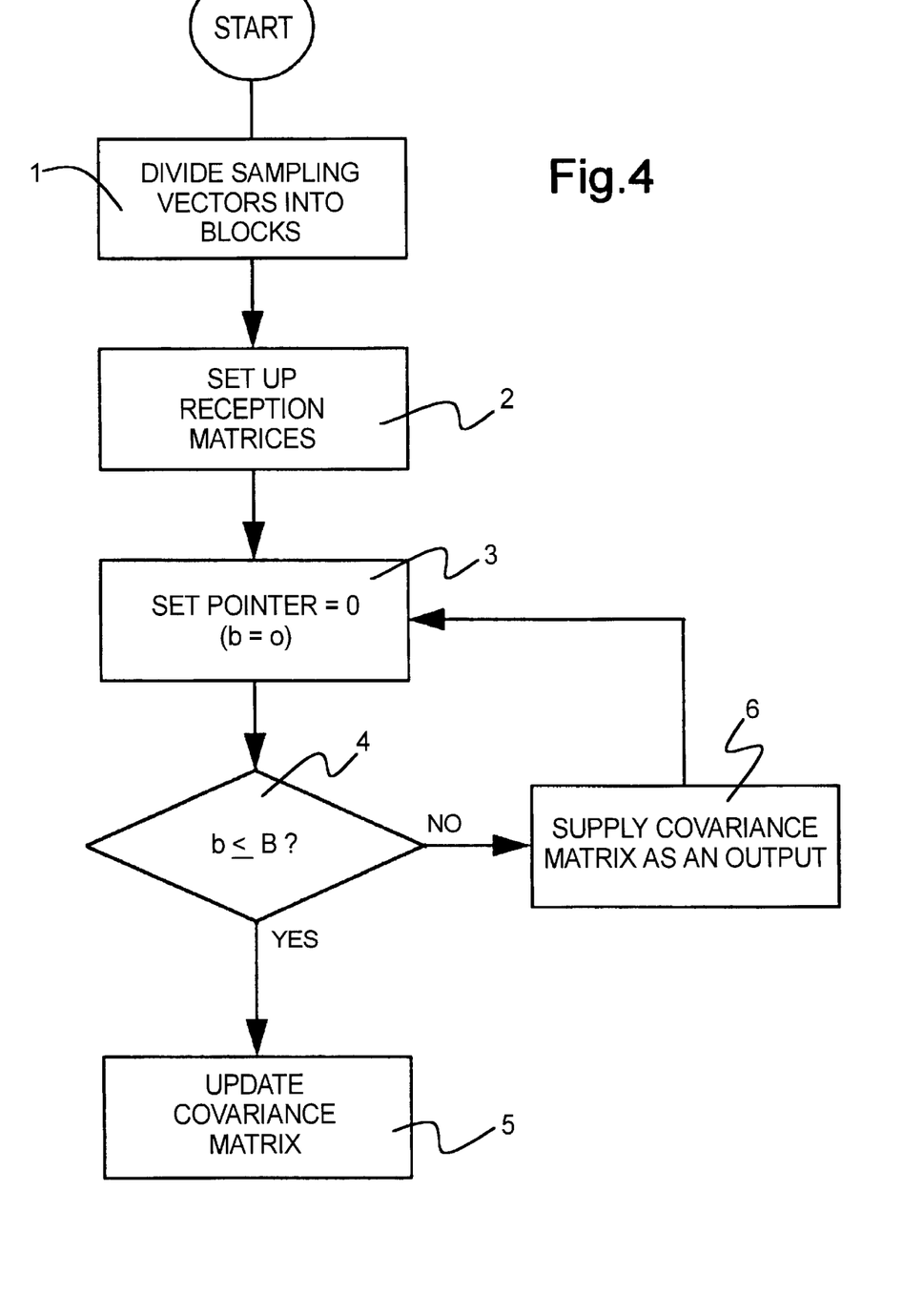
FIG. 4 is a flow diagram of a first embodiment.

FIG. 4 shows a program basic flowchart for a first embodiment, carried out before an allocation of a new mobile station MS to a frequency channel. The spatial covariance matrix C is to be estimated so that in the channels the spatial separability of the connections can be assessed and advantageously influenced by means of suitable channel allocation.

In the first embodiment, it is assumed that a mobile station MS gives notification for a connection setup, and that it thus can use one signaling channel alone. At the antenna means AE of the base station BS, at each time $t_n$, $n=1 \ldots N$ a complex M×1 sampling vector $x_n$ occurs, which depends only on the transmission signal of the one mobile station MS. In addition, there are influences from same-channel disturbances, and there is a noise portion.

The N sampling vectors measured within the notification procedure (Step 1) are divided into B successive blocks $b=1 \ldots B$ of length L, without modification of the chronological sequence, so that N=B×L. By setting the respective L vectors of a block adjacent to one another, B complex M×L reception matrices $X_1 \ldots X_B$ can be set up (Step 2).

In a third Step 3, a pointer is set to b=0, and is then increased by one in each pass. The spatial covariance matrix C is preset to:

$$C = 1/L \cdot X_1 X_1^H \quad (3)$$

before the first pass.

As long as b<=B (Step 4), the fifth Step 5 is executed, which updates the covariance matrix C by means of the following equation:

$$C = (1-\lambda)C + \lambda/L \cdot X_b X_b^H \quad (4)$$

$\lambda$ thereby designates a forgetting factor that controls the influence of previous blocks on the currently calculated value of the spatial covariance matrix C.

In the sixth Step 6, the determined spatial covariance matrix C is outputted, and is; stored for a channel allocation and, if necessary, later calculation of the weighting vector w.

Figure 5:
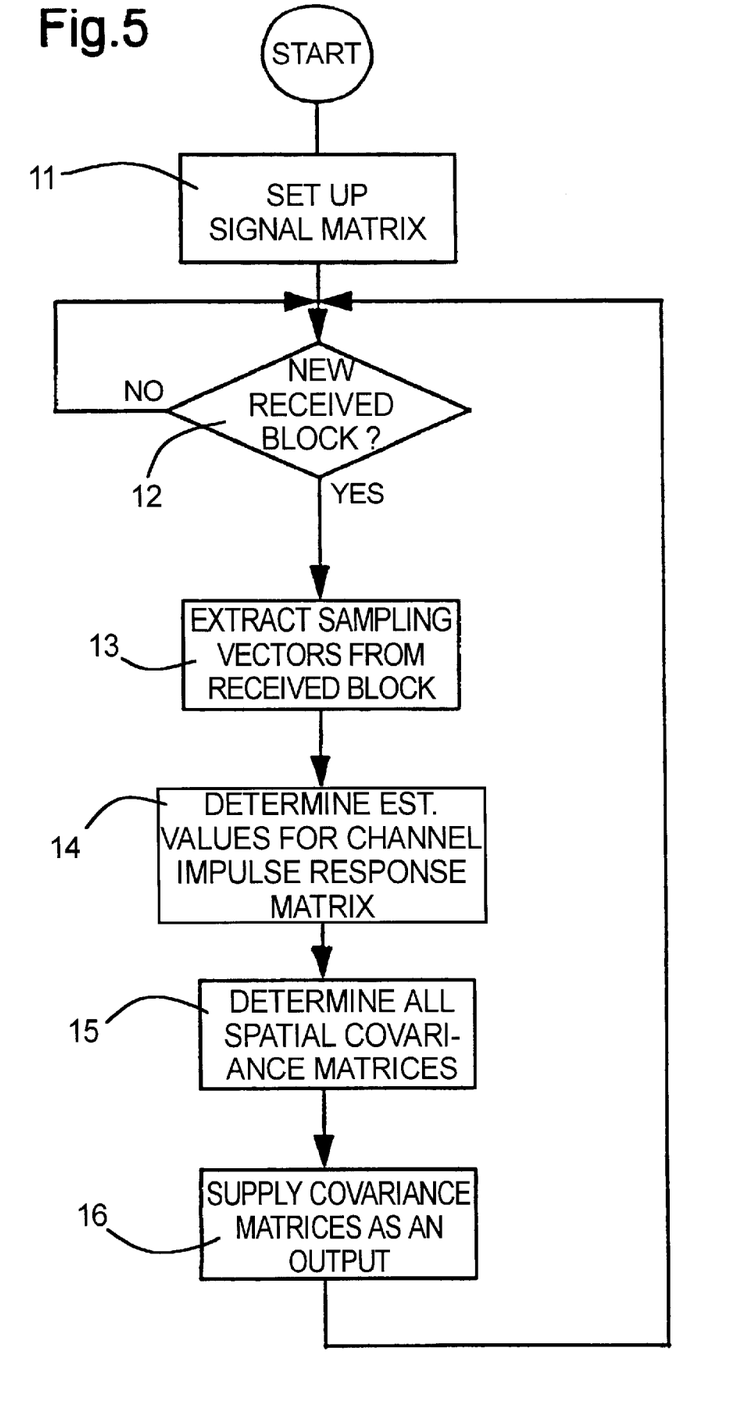
FIG. 5 is a flow diagram of a second embodiment.
Figure 6:
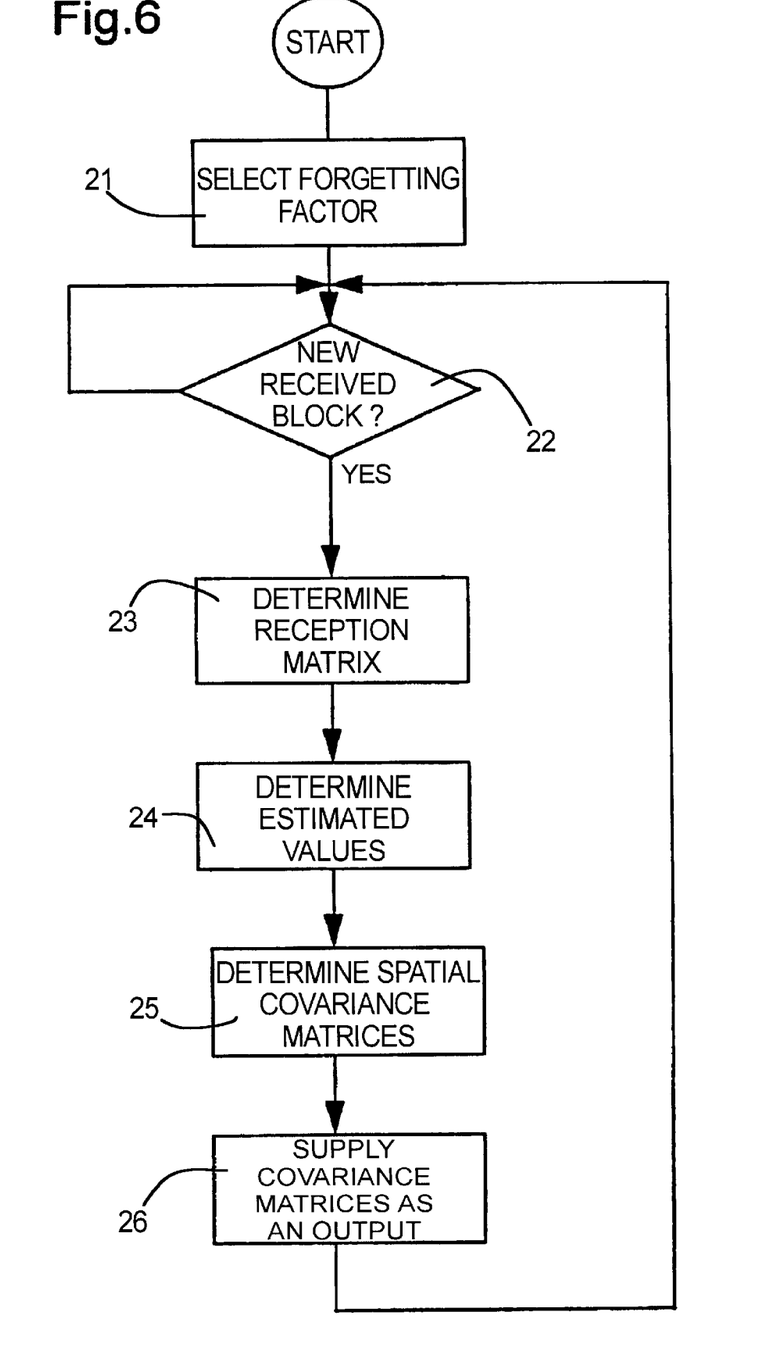
FIG. 6 is a flow diagram of a third embodiment.

In the second and third embodiment, it is assumed that K mobile stations MS communicate in the same frequency channel with the base station BS. At the antenna means AE of the base station BS, at each time $t_n$, $n=1 \ldots N$, there occurs a complex M×1 sampling vector $x_n$, which depends on the transmission signals of the K mobile stations MS, the same-channel disturbances and the noise portion.

In the following, two methods for the determination of updated estimated values for the spatial covariance matrices $C_1$ to $C_k$ of the K mobile stations MS are explained in detail.

The second embodiment according to FIG. 5 is based on a determination of the spatial covariance matrices C before a data detection. Training sequences contained in the reception signals as data known a priori in the receiving base station BS are evaluated. The training sequences are embedded in the transmitted items of useful information. However, as in the DS-CDMA transmission method, a pilot channel formed by means of an individual code can also be evaluated.

Given a suitable synchronization of the K mobile stations MS and a finite channel memory length, by means of a placing adjacent to one another of P M×1 sampling vectors that occur during a training sequence, an M×P reception matrix $$X = (x_1 \ldots x_P) \quad (5)$$

can be produced in such a way that an equation system $$X = HS + N \quad (6)$$

is satisfied, and, besides the entries of the reception matrix X, entries of the (K·V)×P signal matrix $$S = \begin{matrix} S_{1,C} S_{1,2C-1} \ldots S_{1,P+C-1} \\ S_{1,1} S_{1,C} \ldots S_{1,P} \\ S_{K,C} S_{K,2C-1} \ldots S_{K,P+C-1} \\ S_{K,1} S_{K,C} \ldots S_{K,P} \end{matrix} \quad (7)$$

can also be regarded as given. The parameter P is thus selected in such a way that the sampled values $S_{k,1} \ldots S_{k,P+C-1}$ of the modulation signals produced by the mobile stations MS $k=1 \ldots K$ are known a priori.

The dimensionless variable V designates the length of the channel memory, normed to the reciprocal value of the sampling rate. The sampled channel impulse response $h_{m,k}$ of the transmission channel between the individual radiator M and the mobile station k accordingly consists of V complex sampled values (taps). The M×(K·V) channel impulse response matrix H contains the sampled channel impulse responses of the channels between all M individual radiators and all K mobile stations MS, and can be divided into K connection-individual M×V channel impulse response matrices $H_1 \ldots H_K$:

$$H = \begin{bmatrix} h_{1,1}^T & \cdots & h_{1,K}^T \\ \cdots & \cdots & \cdots \\ h_{M,1} & \cdots & h_{M,K} \end{bmatrix} = [H_1 \ldots H_K] \quad (8)$$

The channel impulse response matrix H and the M×P noise matrix N from (6) are unknown. However, if the modulation signals known a priori are long enough that $P \geq K \cdot V$, than (6) represents, in relation to the channel impulse response matrix H, an overdetermined system of equations, so that an estimated value $\hat{H}$ can be determined for H in the sense of the method of the least square (least square estimate):

$$\hat{H} = XS^H(SS^H)^{-1} = XS^+ \quad (9)$$

The calculation of the estimated value $\hat{H}$ can be reduced to a matrix-matrix multiplication in time-critical situations, since the matrix S is known a priori, and the pseudo-inverse $S^+$ can therefore be calculated ahead of time.

According to FIG. 5, in Step 11 the signal matrix S. known a priori, is set up, and the pseudoinverse $S^+ = S^H(SS^H)^{-1}$ can be formed. In addition, the forgetting factor $\lambda_K$ can be selected in connection-individual fashion for $k=1 \ldots K$, with $0 \leq \lambda_K \leq 1$. The spatial covariance matrices $C_k$ are pre with an estimated value originating from active operation or from the phase before the channel allocation. If no suitable value is available, $C_k$ is set to 0.

In Step 12, it is queried whether a new receive block is available. If this is the case, in a Step 13 the sampling vectors belonging to the modulation signals, known a priori, of the K users are extracted from the new received block, and the reception-matrix X is formed according to Equation (5).

In Step 14, the estimated values $\hat{H}$ for the channel impulse response matrix H are determined according to Equation (9), and are divided into connection-individual blocks $H_1 \ldots H_K$ according to Equation (8).

In Step 15, the spatial covariance matrices C are determined for all connections $k=1 \ldots K$ according to the following Equation:

$$C_k = (1-\lambda_k)C + \lambda_k/L \cdot H_K H_K^H \quad (10)$$

and, if warranted, the value is divided by the transmission power of the mobile station, and in step 16 is outputted for further processing.

In the third embodiment according to FIG. 6, it is assumed that after the reception of a data block of length N, an arbitrary detection method provides estimated values for the sampled values $S_{k,1} \ldots S_{k,N}$ of the modulation signal sent by the mobile stations MS. With the aid of these estimated values, the linear system of equations can be set up in a manner similar to (6):

$$X=HS+N \qquad (11)$$

In this case, the M×N reception matrix $$X=(X_1 \ldots X_N) \qquad (12)$$

contains the sampling vectors $x_1 \ldots x_N$ belonging to the corresponding receive data block, the M×N noise matrix N, which describes disturbances contained in the receive data block, the same-channel interferences from other cells, and the receiver noise, and the (K·V)×N signal matrix S $$S = \begin{matrix} S_{1,C} S_{1,2C-1} \ldots S_{1,N+C-1} \\ S_{1,1} S_{1,C} \ldots S_{1,N} \\ S_{K,C} S_{K,2C-1} \ldots S_{K,N+C-1} \\ S_{K,1} S_{K,C} \ldots S_{K,N} \end{matrix} \qquad (13)$$

contains all estimated sampled values of the connection-individual modulation signals. As does (8), the M×(K·V) channel impulse response matrix H contains the sampled channel impulse responses of the transmission channels between the M individual radiators and the K mobile stations MS, and can be divided into connection-individual M×V matrices $H_1 \ldots H_K$.

Here as well, an estimation $\hat{H}$ for H in the sense of the smallest square can be applied by means of the solution of Equation (11). In contrast to the second embodiment, however, the entries of the signal matrix S are not known a priori, so that the pseudo-inverse S+ is not calculated off-line. For this case, it is more advantageous to use methods for the solution of Equation (11) that make due without matrix inversion.

According to FIG. 6, in Step 21 the forgetting factor $\lambda_k$ for k=1 ... K with $0 \leq \lambda_k \leq 1$ is selected in connection-individual fashion. The spatial covariance matrices $C_k$ are preset with an estimated value originating from the active operation or from the phase before the channel allocation. If no suitable value is available, $C_k$ is set to 0.

In Step 22, it is queried whether a new receive block is available. If this is the case, in a Step 23 a reception matrix X is determined from the new received block according to Equation (12), from the sampling vectors belonging to the receive data block, and the signal matrix S is determined according to Equation (13) from the sampled values of the detected modulation signals.

In Step 24, the estimated values $\hat{H}$ are determined for the channel impulse response. matrix H according to Equation (11) in the sense of the method of the least square. For this purpose, it is particularly advantageous to use the method of normal equations or the method of rapid Givens rotations. Further advantageous alternatives include a QR-factoring or a calculation of the pseudo-inverses of the signal matrix S. The estimated channel impulse response matrix H is divided into connection-individual blocks $H_1 \ldots H_K$ according to Equation (8).

In Step 25, the spatial covariance matrices C are determined for all connections k=1 ... K according to the formula shown in Equation (10), and in Step 26 they are supplied as an output for further processing.

If the transmission powers in the upward path of the mobile stations MS (or, respectively, corresponding estimated values) are known, it is again extremely advantageous to divide the estimated value of each spatial covariance matrix $C_k$ by the transmission power of the corresponding mobile station k before further processing.

In a further advantageous version of the invention, advantage is taken of the fact that by definition (see Equation (2)) spatial covariance matrices are hermetic, i.e., they are transformed into themselves by the operation of conjugated complex transposition. It is thus part of the invention, among other things, to simplify or to accelerate the disclosed method steps for the estimation of spatial covariance matrices by calculating only the elements of the left upper half of the spatial covariance matrices (including the main diagonals), since the elements of the right lower half can be produced by mirroring on the main diagonals together with inversion of the sign of the imaginary part of the mirrored matrix entry. For similar reasons, the memory space requirement for the execution of the inventive method can be reduced by storing only half of the entries of spatial covariance matrices, whereby in addition the main diagonal elements, whose value is always real, need be stored in a memory only in the form of their real part.

From the above description it is apparent that the objects of the present invention have boon achieved. While only certain embodiments have been set forth, alternative embodiments and various modifications will be apparent from the above description to those skilled in the art. These and other alternatives are considered equivalents and within the spirit and scope of the present invention.

What is claimed:

1. A method for determining by direct calculation from sampling values measured in an upward direction at the base station, subscriber station-specific spatial covariance matrices of transmission channels between a central station and a predetermined number of subscriber stations of a communication system, wherein the central station includes an antenna consisting of several individual sensors, the method comprising the following steps:

transmitting data sequences respectively from said subscriber stations to said central station via said transmission channels, each of said data sequences containing a known data sequence component;

chronologically sampling values of the individual sensors at the central station and compiling the sampled values as a predetermined number of reception vectors;

determining a channel impulse response for each subscriber station for a transmission path between each subscriber station and each individual sensor of the antenna, dependant on said predetermined number of reception vectors and the reception known data sequence components, without implementing a direction estimate; and for each subscriber station, correlating at least two channel impulse responses which correspond to transmission paths between said subscriber station and two of the individual sensors of the antenna and assigning the two channel impulse responses to a column number and a row number of a spatial covariance matrix for said subscriber station.

2. The method of claim 1 wherein the determining step further comprises recording the channel impulse responses for each subscriber station as time-discrete sampled sets;

arranging the time-discrete sampled sets as row vectors one over the other to provide a channel impulse response matrix for each subscriber station;

generating a conjugated complex transpose response matrix for each subscriber station;

and the method further comprises the step of:

estimating a value of the spatial covariance matrix for each subscriber station by multiplying the channel impulse response matrix for each subscriber station by the conjugated complex transpose response matrix for each subscriber station.

3. The method of claim 2 further comprising the following step:

dividing the estimated value of the spatial covariance for each subscriber station by a transmission power of said subscriber station.

4. The method of claim 1 further comprising the following steps:

transmitting predetermined symbols from each subscriber station to the central station, the transmitted symbols being specific to each subscriber station; and at the central station, assigning the transmitted symbols to the channel impulse responses for each subscriber station.

5. The method of claim 1, further comprising the following steps:

transmitting predetermined symbols from each subscriber station to the central station, the transmitted symbols being specific to each subscriber station;

at the central station, correlating the transmitted symbols from each subscriber station to the reception vectors for said subscriber station; and assigning the transmitted symbols to the channel impulse responses for each subscriber station.

6. The method of claim 1 further comprising the following step:

adjusting the number reception vectors used based on channel transmission coefficients.

7. The method of claim 1 wherein the chronological sampling step is carried out over a predetermined number of sampling times for each subscriber station, and the correlating step is carried out for each sampling time for each subscriber station thereby generating a predetermined number of spatial covariance matrices for each subscriber station, and the correlating stop further comprises averaging the covariance matrices generated for each subscriber station to provide an improved estimated value of the spatial covariance matrix specific to each subscriber station.

8. The method of claim 7 wherein the predetermined number sampling times corresponds to the channel transmission coefficients.

9. The method of claim 7 wherein averaging step further comprises multiplying the spatial covariance matrices for sampling periods that have taken place at an earlier time influence by a factor of less than one and multiplying the spatial covariance matrices that have taken place at a later time by a factor of greater than one.

10. The method of claim 9 wherein the averaging step further comprises exponential forgetting.

11. The method of claim 10 wherein a forgetting factor corresponds to the channel transmission coefficients.

* * * * *